(12) United States Patent
Wu et al.

(10) Patent No.: US 7,507,504 B2
(45) Date of Patent: Mar. 24, 2009

(54) OPTICAL STORAGE SYSTEM (75) Inventors: Pengfei Wu, Malden, MA (US); D. V. Gopal L. N. Rao, Lexington, MA (US)

(73) Assignee: University of Massachusetts, Boston, MA (US)

( * ) Notice: Subject to any disclaimer, the term of this patent is extended or adjusted under 35 U.S.C. 154(b) by 174 days.

(21) Appl. No.: 10/077,601

(22) Filed: Feb. 15, 2002

(65) Prior Publication Data
US 2003/0156523 A1    Aug. 21, 2003

(51) Int. Cl.
*G03H 1/03*    (2006.01)
(52) U.S. Cl. .................... 430/1; 430/2; 359/3
(58) Field of Classification Search ............ 430/1, 430/2–70, 15, 945
See application file for complete search history.

(56) References Cited

U.S. PATENT DOCUMENTS

| | | | |
|---|---|---|---|
| 4,943,126 A | 7/1990 | Lang et al. | 350/3.69 |
| 5,039,182 A | 8/1991 | Dube et al. | 359/3.67 |
| 5,173,381 A | 12/1992 | Natansohn et al. | 430/19 |
| 5,212,572 A | 5/1993 | Krantz et al. | 359/15 |
| 5,316,900 A * | 5/1994 | Tsujioka et al. | 430/270.15 |
| 5,442,433 A | 8/1995 | Hoshino et al. | 356/71 |
| 5,486,934 A | 1/1996 | Huang | 359/15 |
| 5,543,251 A * | 8/1996 | Taylor | 430/1 |
| 5,548,427 A | 8/1996 | May | 359/73 |
| 5,757,525 A | 5/1998 | Rao et al. | 359/108 |
| 5,838,467 A | 11/1998 | Curtis et al. | 359/3 |
| 5,856,048 A * | 1/1999 | Tahara et al. | 430/1 |
| 5,963,532 A | 10/1999 | Hajjar | 369/112 |
| 6,172,777 B1 | 1/2001 | Flood et al. | 359/10 |
| 6,288,986 B1 | 9/2001 | McDonald et al. | 369/44.23 |
| 2001/0002895 A1 * | 6/2001 | Kawano et al. | 369/103 |

(Continued)

FOREIGN PATENT DOCUMENTS

EP    0 992 485 A1    4/2000

(Continued)

OTHER PUBLICATIONS

Fei et al. "Biphoton holographic storage in methyl orange and ethyl orange dyes", Opt. Lett., vol. 19(6) pp. 411-413 (Mar. 1994).*

(Continued)

*Primary Examiner*—Martin J Angebranndt
(74) *Attorney, Agent, or Firm*—Wilmer Cutler Pickering Hale and Dorr LLP (57) ABSTRACT The present invention includes an optical system to control and optimize molecular reorientation for information storage. A preferred embodiment of the invention utilizes light sources emitting at wavelengths centered on or around the absorption bands of the storage medium. The light can be selectively polarized to control orientation of molecular components of organic material to provide non-volatile storage of large amounts of information. This provides an alternative to magnetic, electric, magneto-optical, or electro-optical methods which are complex and expensive. The all-optical holographic method in accordance with the present invention provides a storage system with extremely high memory capacity. In accordance with another aspect of the present invention, a system for optically storing and retrieving data includes optically recording (writing) and retrieving (reading) with the same wavelength beam, for example, without additional conditions such as an electric or magnetic field.

17 Claims, 10 Drawing Sheets

U.S. PATENT DOCUMENTS

2001/0050786 A1    12/2001    Curtis et al. ............ 359/6

FOREIGN PATENT DOCUMENTS

| JP | 62-165751 | * | 7/1987 |
| JP | 63-259850 | * | 10/1988 |
| JP | 06-072050 | * | 3/1994 |
| JP | 09-269719 | * | 10/1997 |
| JP | 2000-293849 | * | 10/2000 |
| WO | WO 96/38410 | | 12/1996 |
| WO | WO 99/57719 | | 11/1999 |
| WO | WO 00/33142 | | 6/2000 |
| WO | WO 01/45111 A1 | | 6/2001 |

OTHER PUBLICATIONS

Jager et al. "Bicolor surface reliefs in azobenzene side chain polymers", Appl. Opt., vol. 40(11) pp. 1776-1778 (Apr. 2001).*

Wu et al., "Transient biphotonic holographic grating in photoisomerizative azo materials", Phys. Rev. B, vol. 57(7) pp. 3874-3880 (Feb. 1998).*

Wu et al., 'Image storage based upon biphotonic holography in azo/polymer system', Appl.Phys Lett., vol. 72(4) pp. 418-420, (Jan. 1998).*

Sanchez et al., 'Biphotonic holographic gratings in azo benzes polyesters surface relief phenomena and polarization effets', Appl. Phys. Lett vol. 77(10) pp. 1440-1442 (Sep. 2000).*

Wu et al., 'Biphotonic self diffraction in azo-doped polymer film' Appl. Phys. Lett. vol. 70(10) pp. 1224-1226.*

Bach et al., 'Biphoton-induced refractive index change in 4-amino-4'nitrobenzene/polycarbonate', J. Chem. Phys., vol. 100(10) pp. 4135-4140.*

"The Merck Index", tenth Ed. (1983) p. 874.*

Wu et al., 'Spatial light modulation with an azobenzene-doped polymer by use of biphtonic holography', Opt. Lett. vol. 24(12) p. 841-843 (Jun. 1999).*

Wu et al., 'Transient optical modulation with a disperse red-1- doped polymer film', Appl.Opt. vol. 39(5) pp. 814-817 (Feb. 2000).*

Natansohn et al., "Azo-benezene containing polymers:digital and holographic storage" Technical Report 19960924 052 US Navy (Sep. 1996).*

Hattemer et al., "synthesis and characterization of novel multifunctional materials obtained via reactive precursor polymers", Macromol. vol. 33 p. 1972-1977 (2000).*

"Polymer Chemistry: the glass transition" updated Jul. 11, 2000. http://faculty.uscupstate.edu/llever/Polymer%20Resources/GlassTrans.htm (3 pages).*

Todorov et al., "Polarization Holography. 1: A new high efficiency organic materials with reversible photoiniduced birefringence", Appl. Opt. vol. 23(23) pp. 4309-4312.*

Choi, "Effect of temperature on photoinduced reorientation of azo benzene chromophore in the side chain copolymers", Bull. Korean Chem. Soc., vol. 20(9) pp. 1010-1016 (1999).*

Wu, P., et al. "Nonvolatile grating in an azobenzene polymer with optimized molecular reorientation," Applied Physics Letters, V 78;(9);Feb. 26, 2001, pp. 1189-1191.

Choi, D. H., "Effect of Temperature on Photoinduced Reorientation of Azobenzene Chromophore in the Side Chain Copolymers", *Bull. Korean Chem. Soc.*, 1999, vol. 20, No. 9, pp. 1010-1016.

Tripathy, S. et al., "Recent advances in polymers for electronics and optics", *Pure & Appl. Chem.*, 1998, vol. 70, No. 6, pp. 1267-1270.

\* cited by examiner

102 AND 120: RED COHERENT LASER BEAMS WITH LINEAR POLARIZATION

103 AND 104: BLUE LIGHT BEAM (NOT REQUIRED TO BE COHERENT) WITH LINEAR POLARIZATION

105: AZOBENZENE-PVA FILM

Figure 3

110: READING BEAM OF RED COHERENT LASER

105: AZOBENZENE-PVA FILM

106: RED DIFFRACTION BEAM

107: PHOTO-DETECTOR

OPTICAL STORAGE SYSTEM

BACKGROUND OF THE INVENTION

Molecular orientation controlled by light is useful for many applications such as display and information storage. Small molecular size permits high spatial resolution. Holographic data storage is an attractive technique because of its extremely high capacity, fast data access, and exceptionally fast data transfer rate.

In holographic storage, information data is recorded as gratings, as either refractive index modulation or absorptive index modulation, in the optical recording medium. Therefore, the physical characteristics of the recording medium are important for the performance of the holographic storage system. Organic materials are receiving much attention for this application due to inexpensive cost, easy preparation of large area optical films and possibility of high diffraction efficiency. However, the stored information can be easily erased by reading with a wavelength close to the wavelength used to write the information. Nonvolatile holographic storage is achieved using inorganic crystals doped with two centers such as Lithium Niobate doubly doped with iron and manganese. The use of inorganic crystals is disadvantageous due to high cost, slow response and difficulty in preparation of thin films with a large area.

There still remains a need for providing nonvolatile optical storage systems.

SUMMARY OF THE INVENTION

The present invention includes an optical system to control and optimize molecular reorientation for information storage. A preferred embodiment of the invention utilizes light sources emitting at wavelengths centered on or around the absorption bands of the storage medium. The light can be selectively polarized to control orientation of molecular components of organic material to provide non-volatile storage of large amounts of information. This provides an alternative to magnetic, electric, magneto-optical, or electro-optical methods which are complex and expensive. The all-optical holographic method in accordance with the present invention provides a storage system with extremely high memory capacity. In accordance with another aspect of the present invention, a system for optically storing and retrieving data includes optically recording (writing) and retrieving (reading) with the same wavelength beam, for example, without additional conditions such as an electric or magnetic field.

In accordance with another aspect of the present invention, a system for optically storing and retrieving data uses thin films of organic material which are inexpensive and readily available commercially. Information can be stored permanently and read out repeatedly without erasing. In a preferred embodiment, CD-like devices are developed using the methods of the present invention. In a preferred embodiment, nonvolatile gratings based on optimizing molecular reorientation of a photoisomerized polymer such as an azobenzene thin film, for example, by using polarized light beams of two colors is formed. The azobenzene organic material is inexpensive and commercially available. Optical quality thin polymer films of the material with large area can be easily prepared. Polarized blue color light is used to generate trans-cis isomerization and molecular reorientation. A red beam causes cis-trans isomerization, which optimizes effectively the reorientation when the red light is polarized perpendicularly to the blue light. This reorientation enables transfer of a volatile isomerization grating to a nonvolatile molecular reorientation grating. In a preferred embodiment the stored information can be read repeatedly for 12 hours without volatility by using a beam with the same wavelength as the writing beam.

In a preferred embodiment, an optical storage medium includes a polymer material having an optically activated molecular transition between a first geometric orientation and a second geometric orientation. The medium is writeable and readable with light within a wavelength band that in a particular embodiment is the same wavelength.

In accordance with another aspect of the present invention, a method for optimizing reorientation of photonisomeric molecules includes illuminating the molecules with a light (blue light) polarized in a first direction and illuminating the molecules with a second light (red light) polarized in a second direction. The first direction is orthogonal to the second direction. A preferred embodiment of the present invention optimizes photoassisted poling to enhance second order nonlinear optics.

The foregoing and other features and advantages of the system and method for holographic storage will be apparent from the following more particular description of preferred embodiments of the system and method as illustrated in the accompanying drawings in which like reference characters refer to the same parts throughout the different views.

The drawings are not necessarily to scale, emphasis instead being placed upon illustrating the principles of the invention.

DETAILED DESCRIPTION OF THE INVENTION

Holographic recording offers an attractive solution for the next generation of digital storage systems for the ability to optically record and retrieve multiple superimposed holograms, and transfer in parallel the corresponding page-formatted digital data. Because of these unique properties, holographic data storage systems hold promise for extremely high capacity ($Tb/cm^3$), exceptionally fast data access and transfer rate (Gb/sec). In holographic storage, information data is recorded as gratings (refractive index modulation or absorptive index modulation) in the optical recording medium. Therefore, the physical characteristics of the recording medium are important for the performance of the holographic storage system. Preferred embodiments of the system of the present invention use a holographic grating based on optimizing molecular reorientation of a photo-isomerized azobenzene film with polarized light beams of two colors. Polarized blue color light is used to generate trans-cis isomerization and molecular reorientation. A red beam causes cis-trans isomerization, which optimizes effectively the reorientation when the red light is polarized perpendicularly to the blue light. The reorientation enables transfer of a volatile isomerization grating to a nonvolatile molecular reorientation grating. The stored information can be read repeatedly without volatility by using a beam with the same wavelength as the writing beam. In a preferred embodiment, the stored information may be enhanced during the reading process. In addition, the response time is less than one (1) second when the same polarized red and blue beams are applied. The azobenzene organic chemical is inexpensive and commercially available and an attractive material for optical storage applications. Optical quality thin polymer films of the material with large area can be prepared with ease.

The molecular photo-induced reorientation usually takes place in fluid systems such as liquid crystals. However, the azobenzene derivatives can be oriented in solid matrices by polarized light due to the accompanying process of trans-cis-trans isomerization. Irradiation of azobenzenes with photon energies corresponding to their electronic excitation causes changes of the orientational distribution of the transition dipole moments of the chromophores. In this process, the dipole transition moments of the chromophores evade from the polarization direction of the incident light, so that samples with an initially isotropic distribution of their molecular orientations may become anisotropic. Moreover, if such samples are irradiated under static electric fields, the transformation to macroscopically polar materials has been observed. Reorientation effects may be used for high-density information storage, and with photoassisted poling, the formation of materials with high (second order and higher) nonlinear optical coefficients may be feasible.

The trans azobenzene derivatives are stable with an elongated molecular form and the cis azobenzenes are photoinduced isomers with a bent form and revert back to trans form thermally or by light. The length of azobenzene part of the derivatives is about 1.0 nm for the trans form but only 0.56 nm for the cis form. This change of molecular dimension results in the bent cis form rotating more easily than the trans. Electron push-pull substituents such as paradonor and para'acceptor enhance the reorientation anisotropy of the azobenzenes. In some matrices of bulk polymers, after blocking light, reorientation of the azobenzene molecules can be frozen below the glass transition temperature ($T_g$) due to the restriction of free volume of the polymer to the movement of the trans molecules.

In a preferred embodiment, a thin polymer film of poly (vinyl alcohol) (PVA) doped (1% by weight) with an azobenzene of 4-[4-(dimethylamino)-phenylazo]benzenesulfonic acid, sodium salt is used. The linear absorption of the azobenzene (trans form) shows a broad absorption band centered around 450 nm due to $\pi \rightarrow \pi^*$ transition. Beyond 600 nm the film is transparent. Under irradiation with blue light, the spectrum shows a small absorption beyond 600 nm due to the photo-induced cis isomer. The PVA polymer with average molecular weight in the range of 124 000-186 000 is transparent in the visible region. Both chemicals are water-soluble. To get a good homogeneous mixture, the mixed solution is stirred for approximately 2 hours after pouring the azobenzene powder into the PVA solution which was dissolved with distilled water and also stirred for approximately 2 hours. The homogeneous mixed solution was coated on an optical glass substrate. In accordance with a preferred embodiment, the entire process of the film preparation may be conducted at about 85° C. close to $T_g$ temperature of PVA polymer. In a preferred embodiment the thickness of the polymer film may be about 10 µm.

In a preferred embodiment, this molecular reorientation can be optimized effectively when the molecules are irradiated simultaneously by an additional long-wavelength light polarized perpendicularly to the first light beam. The optimization of molecular reorientation offers the ability for the sample to store and read information using coherent light with the same long-wavelength without volatility. This optimization of molecular reorientation is exploited in preferred embodiments of the present invention holographic storage system.

Figure 1:
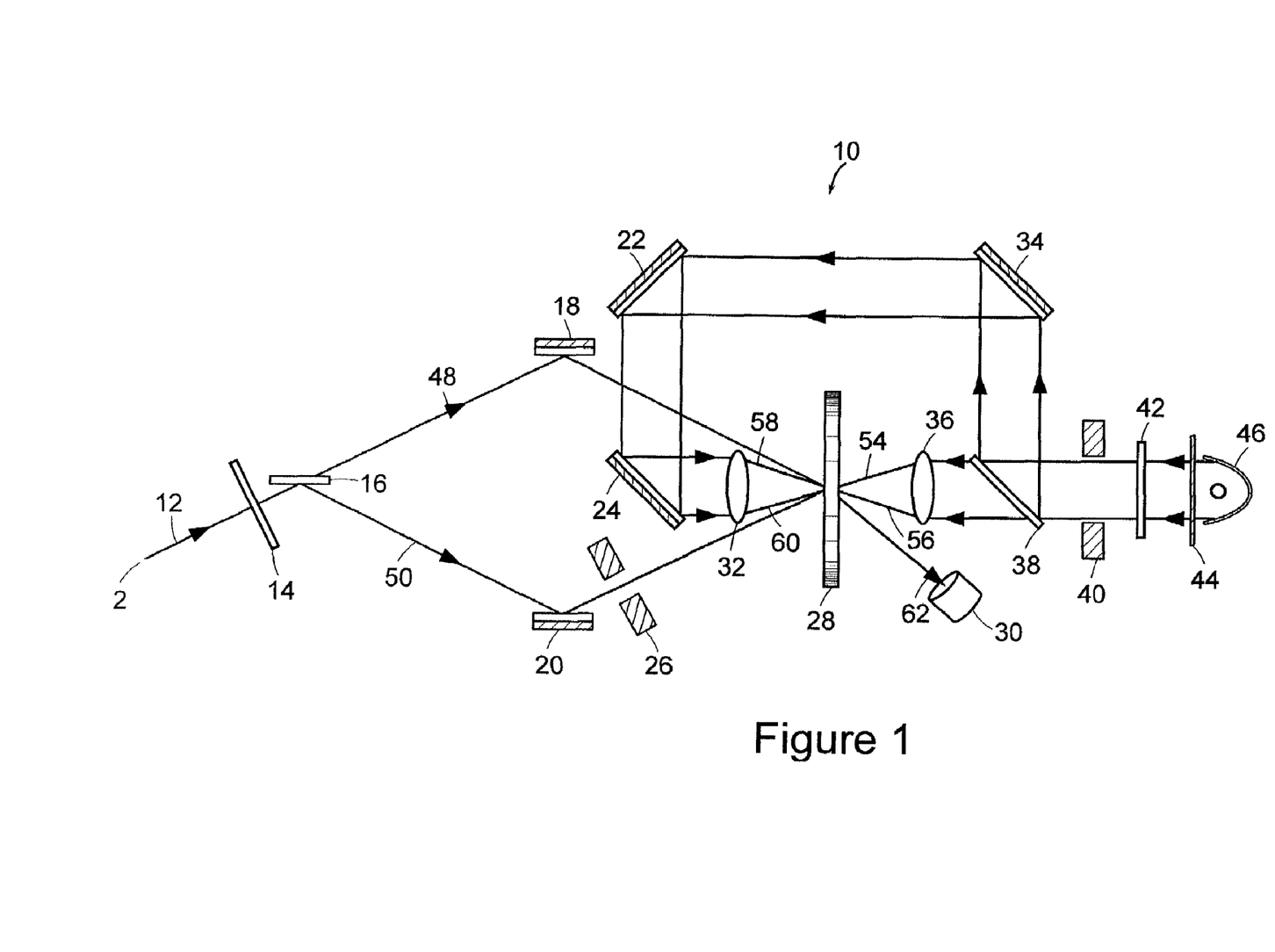
FIG. 1 is a schematic diagram of a system of a preferred embodiment for optically recording in accordance with the present invention.

FIG. 1 depicts the schematic of a preferred embodiment of optical recording in accordance with the present invention for nonvolatile holographic storage. Input light 12 from a red laser source 2 is polarized by polarizing element 14. The polarized light beam then strikes an optical surface, such as a beamsplitter 16, at a non-perpendicular angle. The beams 48 and 50 result from the split into two components at the beamsplitter 16. Beam 48 is reflected from a mirror 18 onto the azobenzene film 28. Beam 50 is in turn reflected from mirror 20 and passes through shutter 26 and is then incident on the azobenzene film 28. In a preferred embodiment beams 48, 50 are s-polarized 647 nm beams. It should be noted that the coordinate system used is defined by the plane containing the incoming wavetrain and the normal to the surface. Thus, light with a polarizing vector lying in this plane is called p-polarized and light which is polarized perpendicular to this plane is called s-polarized. Focusing elements 32 and 36 are used to focus the beams generated by lamp 46. These beams 54, 56, 58, 60 are p-polarized 442 nm light in a preferred embodiment. The light generated by the lamp 46 is filtered by filter 44, passes through a polarizer 42, shutter 40 before being split into components at the beam splitter 38. One component is focused onto the azobenzene film using the lens 36, while the second component is reflected off mirrors 34, 22 and 24, respectively and then focused using lens 32 to result in beams 58, 60 which are incident on the opposite surface of the azobenzene film compared to beams 54, 56. The diffracted beam 62 is detected by a photo-detector 30.

Figure 2:
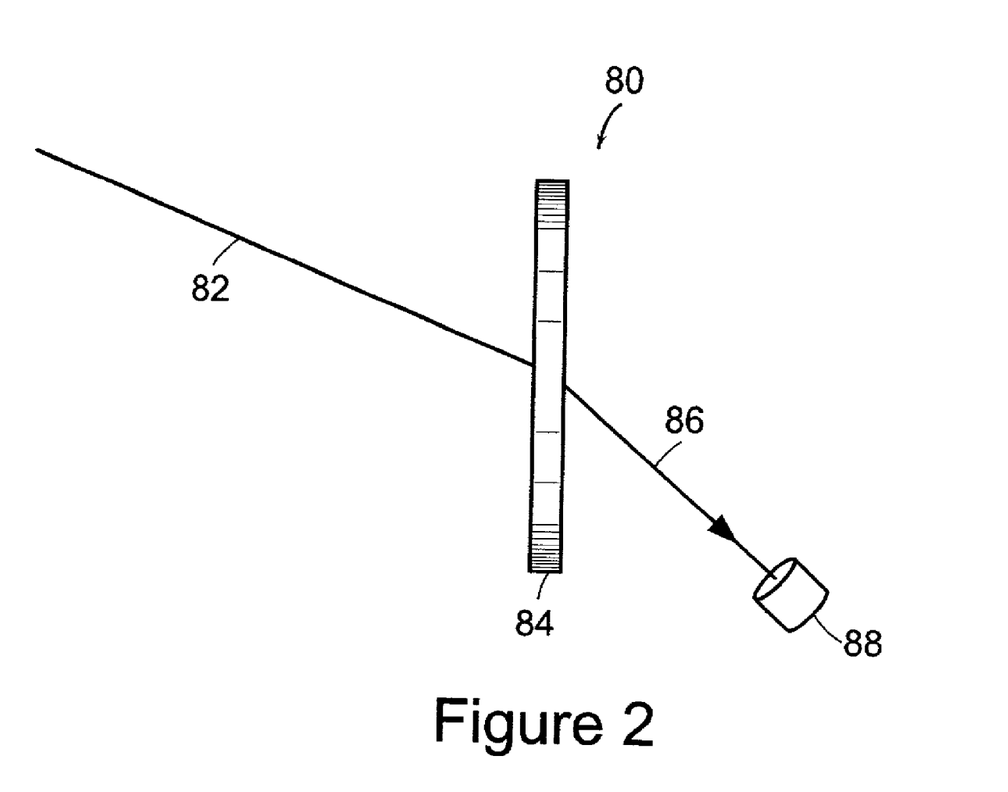
FIG. 2 is a schematic diagram of a system of a preferred embodiment for retrieving data in accordance with the present invention.

FIG. 2 is a schematic diagram of a system of a preferred embodiment for optically retrieving data in accordance with the present invention. A red beam 82 provided by a laser source is incident on the azobenzene film 84. The wavelength of the red beam is the same wavelength as the writing beam. In a preferred embodiment, the wavelength is about 647 nm. In a preferred embodiment, the red beam is a coherent beam. In a preferred embodiment, if the writing system is integrated with the reading system then the blue polarized light is blocked and the optical retrieval process progresses using the red beam. The red diffractive beam is detected by the photo-detector 88.

Figure 3:
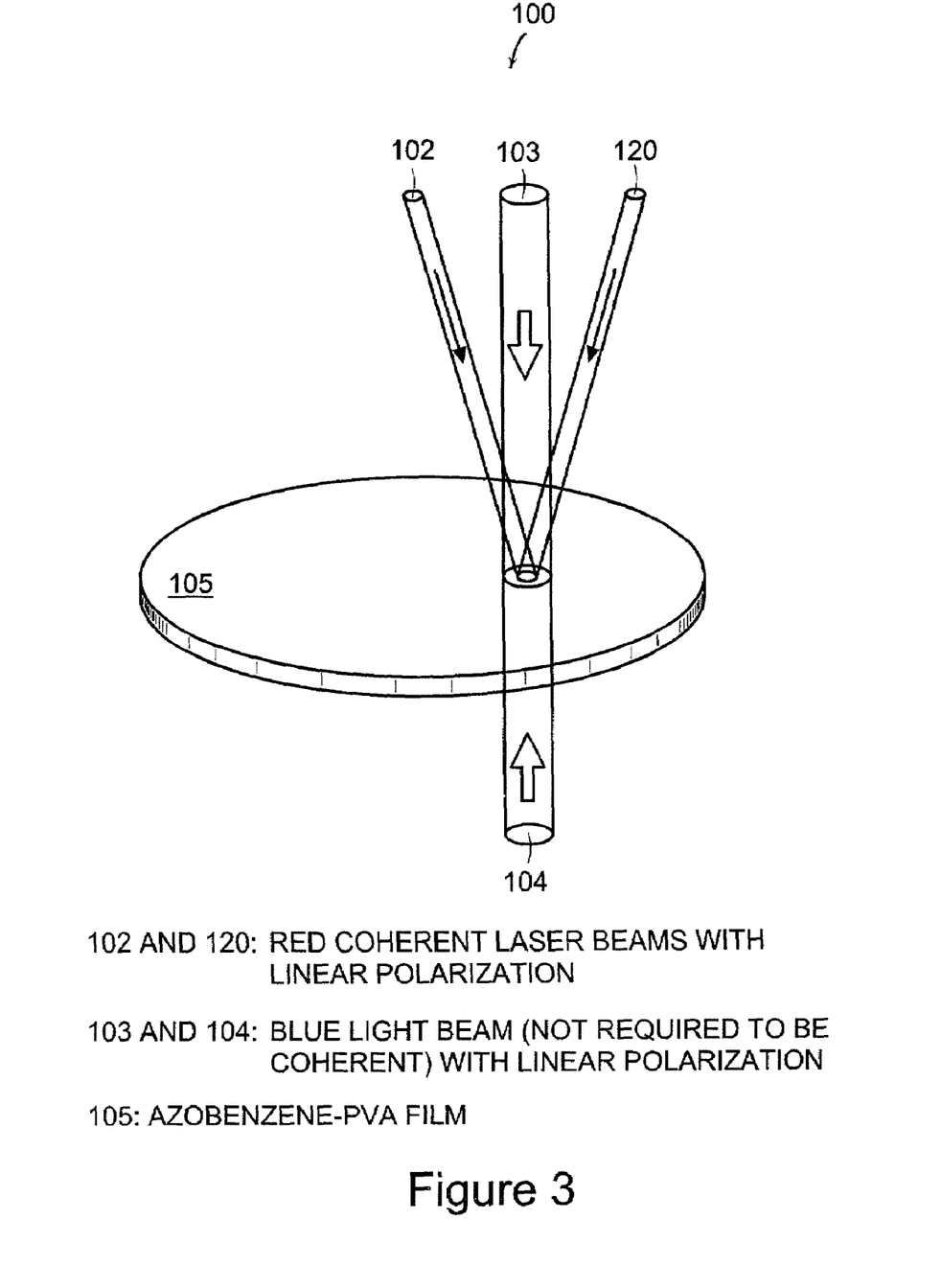
FIG. 3 is a diagram illustrating an optical recording (writing) process, in particular the light beams involved in the process, in accordance with a preferred embodiment of the present invention.

FIG. 3 is a diagram illustrating the light beams, in particular during optical recording. Two s-polarized coherent beams 102 and 120 from a laser at 647 nm intersect on the surface of the azobenzene film 105 with an angle of about 5° to form the holographic grating. Beams 103 and 104 at a wavelength of 442 nm irradiate the film from both sides in order to bring about uniform trans-cis isomerization and pre-orientation. The blue beam need not be coherent. In a preferred embodiment, an incoherent light source with short-wavelength can be used in this system.

Figure 4:
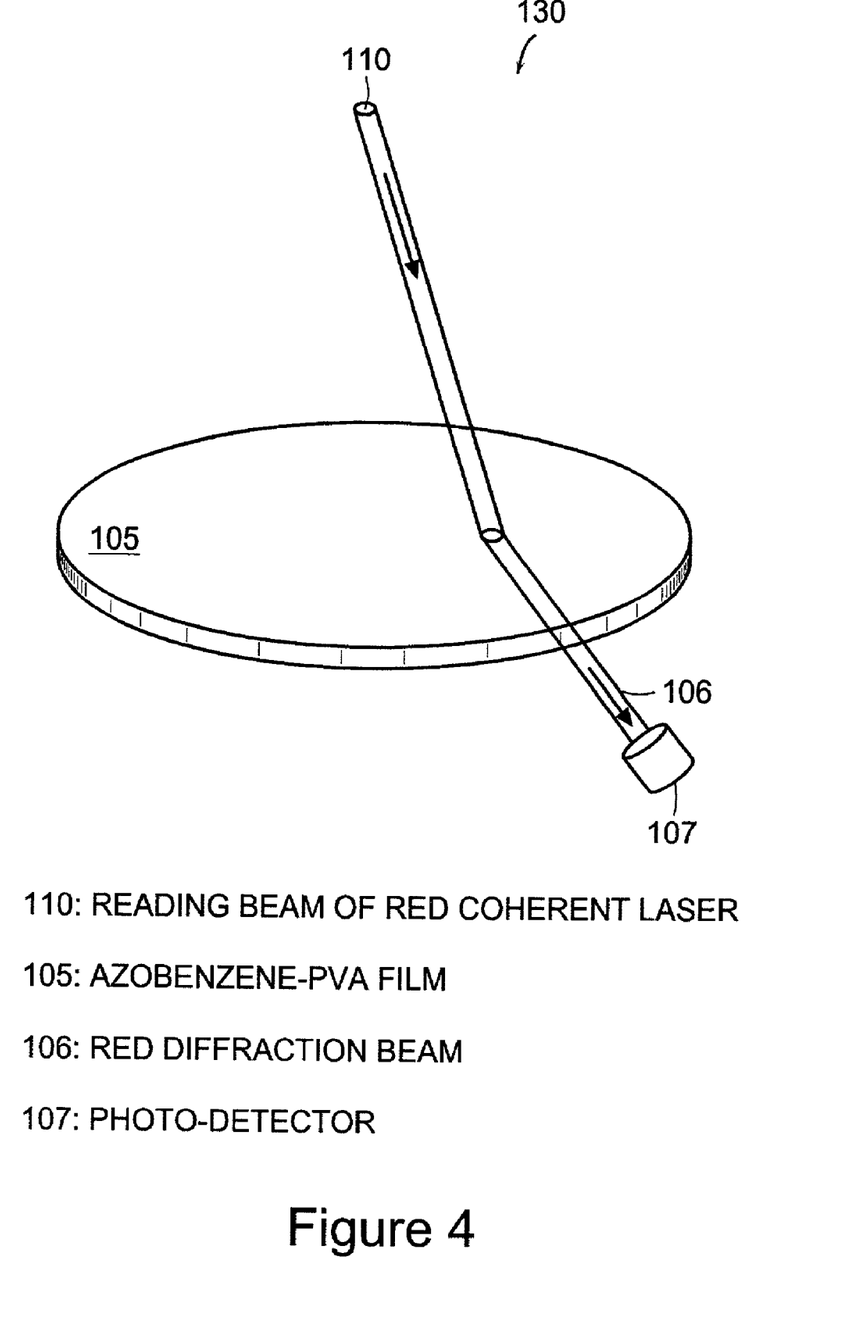
FIG. 4 is a diagram illustrating a retrieval (reading) process, in particular the light beams involved in the process, in accordance with a preferred embodiment of the present invention.

FIG. 4 is a diagram illustrating a retrieval process, in particular the light beams involved in the reading process, in accordance with the present invention. The first-order signal of beam 110 of self-diffraction (read by its writing beams) is detected with a photo-detector 107.

Photoinduced anisotropy can be achieved in a preferred embodiment by use of polarized exciting beams of two colors to investigate the features of optimization of reorientation of the azobenzene molecules. The sample can be placed between two crossed polarizers (vertical and horizontal) and a weak He—Ne 633 nm beam (10 mW/cm$^2$) may be used to probe the photoanisotropy of the sample. Initially no light reaches the detector due to the random distribution of the azobenzene molecules. When an exciting beam polarized at an angle of 45° to the vertical from a 442 nm He—Cd laser irradiates the sample, the analyzer transmits some 633 nm light. This photoinduced anisotropy is due to the reorientation of the azobenzene molecules induced by the 442 nm light. The azobenzene transition moment lies along the molecular axis and only the molecules with their orientation parallel to the electric vector absorb light. The repeated trans-cis-trans isomerization results in the alignment of azobenzene molecules in the direction perpendicular to the polarization of the exciting beam. The molecular reorientation can be optimized by using another beam of long wavelength.

Figure 5:
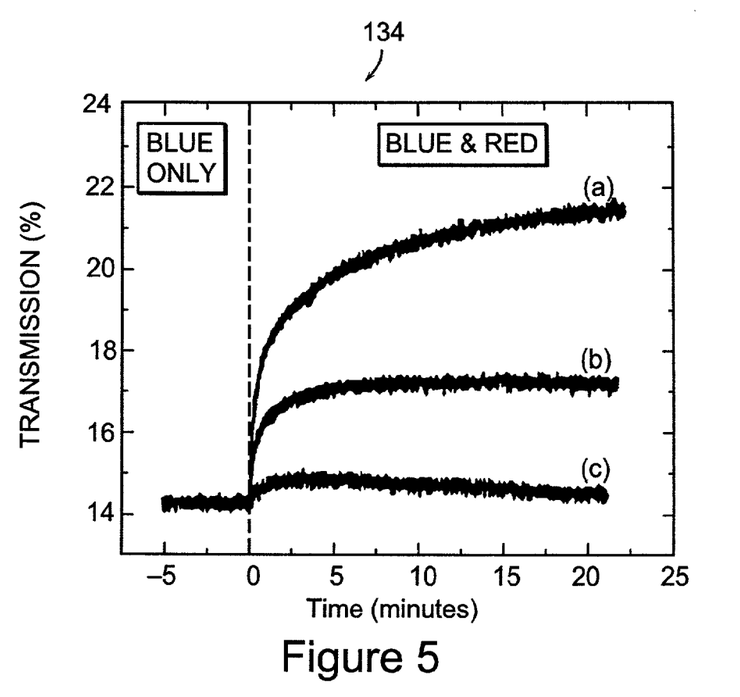
FIG. 5 graphically illustrates percentage of transmission as a function of time of polyvinyl alcohol film doped with 4-[4-(dimethylamino)-phenylazo]benzenesulfonic acid, sodium salt, by using two color exciting beams with different polarizations. After the photoanisotropy induced by a 442 nm blue beam (180 mW/cm$^2$) polarized at 45° to the vertical reaches the saturable value, the red 647 nm exciting beam (2.2 W/cm$^2$) is turned on polarized (a) perpendicularly, (b) circularly, and (c) parallel to the blue beam in accordance with preferred embodiments of the present invention.

To prevent any absorption by the trans isomers, a red 647 nm beam from Ar—Kr ion laser is used to irradiate the sample counter to the direction of the blue beam. When the red beam is polarized perpendicularly to the blue beam, the photoinduced anisotropy by the polarized blue light is enhanced greatly. The results are shown in FIG. 5 which illustrates percentage of transmission as a function of time of polyvinyl alcohol (PVA) film doped with 4-[4-(dimethylamino)-phenylazo]benzenesulfonic acid, sodium salt, by using two color exciting beams with different polarizations. After the photoanisotropy induced by a 442 nm blue beam (180 mW/cm$^2$) polarized at 45° to the vertical reaches the saturable value, the red 647 nm exciting beam (2.2 W/cm$^2$) is turned on polarized (a) perpendicularly, (b) circularly, and (c) parallel to the blue beam in accordance with preferred embodiments of the present invention. With a circularly polarized red beam, the photoanisotropy is also increased but the value is less than in the former case. With the red beam polarized parallel to the blue beam, the enhancement is very small.

Figure 6:
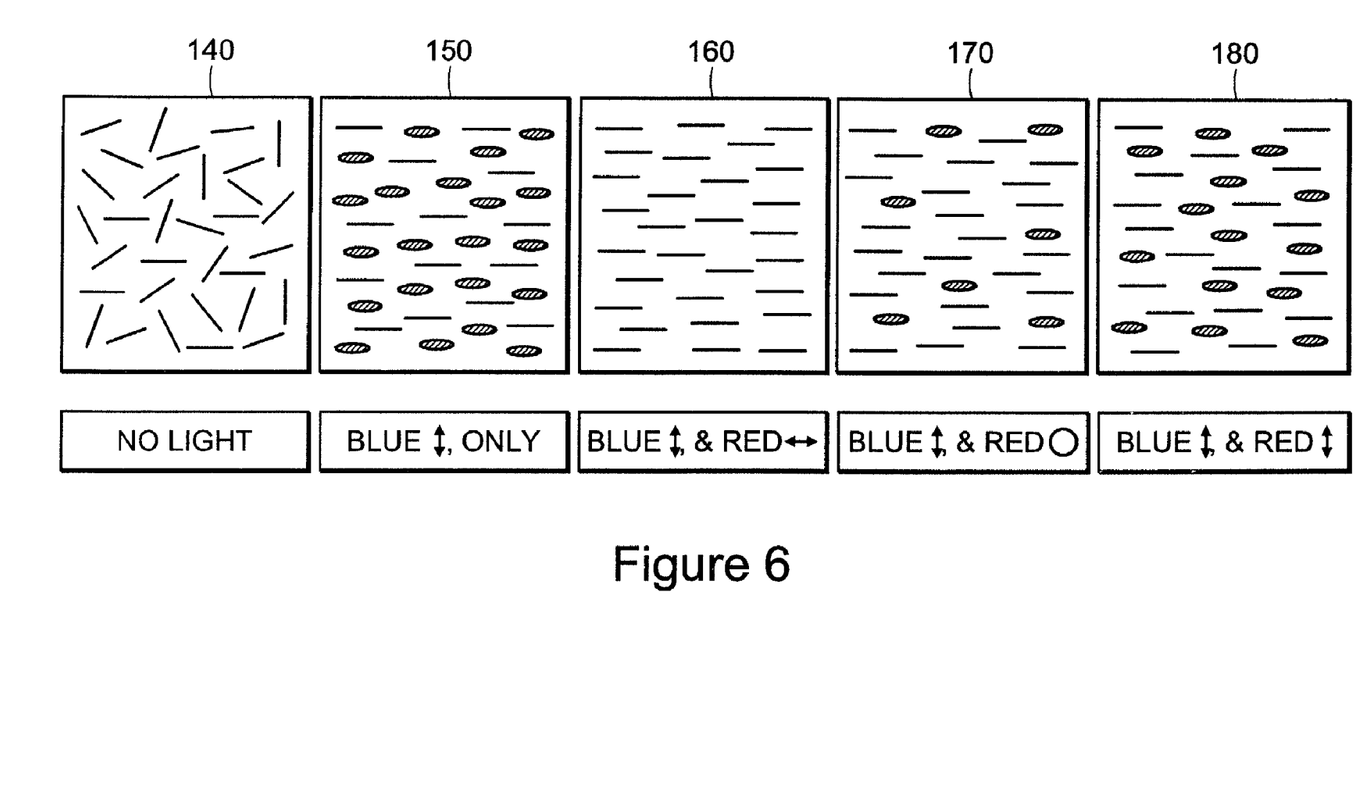
FIG. 6 is a schematic illustration of optimizing reorientation of the azobenzene molecules induced by linearly polarized blue light as well as by a combination of polarized blue and red beams, wherein the strips represent the trans isomers absorbing blue light and the ellipses represent the cis isomers absorbing red light in accordance with preferred embodiments of the present invention.

The mechanisms of optimizing molecular reorientation are illustrated in FIG. 6 wherein the strips represent the trans isomers absorbing blue light and the ellipses represent the cis isomers absorbing red light. When the film is irradiated only by the blue beam 140, the azobenzene distribution shows a mixture of trans and cis form oriented perpendicularly to the blue light polarization due to repeated absorption of trans and cis isomers with their axes oriented in any direction not cross to the blue polarization. The molecular anisotropy depends on push-pull substituents in 4- and 4'- (para and para') positions, respectively. In the trans linear form the substituents are on the molecular axis enhancing the delocalization of the $\pi$ electrons. On the other hand, in the bent cis form the substituents are situated off the molecular axis decreasing the anisotropy. However, if the red exciting beam polarized parallel to the direction of cis transition moment also irradiates the sample, the cis isomers isomerize back to the trans form by absorbing the red light. The trans isomers absorb blue light again if their axes are not perpendicular to the blue light polarization, until all molecules become trans form with their axes in the direction of the red light polarization. The elongated trans isomer does not absorb red light and exhibits much larger anisotropy than the cis isomer. The circularly polarized red light also optimizes the reorientation but not thoroughly. For the case where the red light is polarized parallel to the blue light, there is no significant improvement in the reorientation because the cis isomers do not absorb the red light polarized perpendicularly to their axes.

To ensure an initially random distribution of the molecules, in a preferred embodiment, the film is preirradiated for two (2) minutes by a circularly polarized blue light before writing the grating. Then, the blue light polarization is changed and red beams are turned on. The signal intensity depends significantly on the polarization of the blue light. By using p-polarized blue beam, the signal intensity is about eight times larger than that by using the s-polarized beam. The reason for this can be understood from FIG. 6. The azobenzene molecules located in the dark fringes of red interference field are aligned only by the polarized blue light. However, the molecules in the red bright fringes are aligned by both blue light and red light. As the reorientation is optimized more efficiently by additional red light polarized perpendicular than parallel to the blue polarization, the reorientation grating with the p-polarized blue light is more intense than that with the s-polarized.

Figure 7:
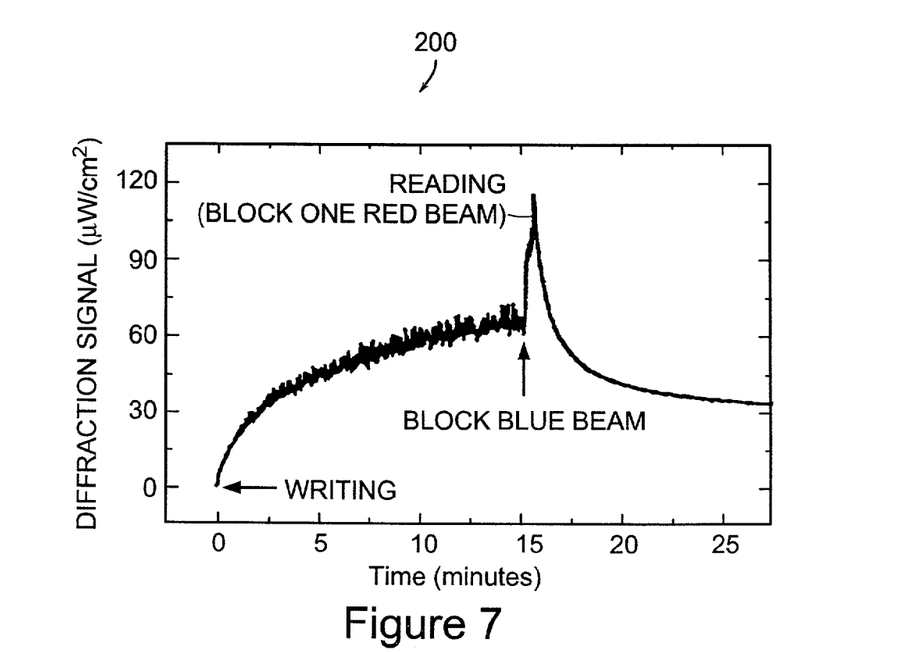
FIG. 7 graphically illustrates the temporal relationship of grating recording and grating read-out with s-polarized 647 nm beams and p-polarized 442 nm light in accordance with a preferred embodiment of the present invention.

FIG. 7 graphically illustrates the temporal relationship of grating recording and grating read-out with s-polarized 647 nm (red) beams and p-polarized 442 nm (blue) light in accordance with the present invention. It is shown that the signal increases after turning on the writing beams. When blocking the blue light, the signal quickly increases because there exists an enhanced isomerization grating in which the cis isomers in the bright red fringe isomerize further back to the trans form due to the termination of trans-to-cis isomerization. The response of the weak isomerization grating is fast but it is usually masked by the reorientation grating. Moreover, the isomerization grating cannot last long due to the limited lifetime of cis isomer. After the isomerization grating reaches its maximum, one red writing beam is blocked and another red beam to read the grating is used. The results show another immediate increase as the grating read by one beam gives higher diffraction efficiency than when it is read by two beams. The two beam geometry corresponds to self-diffraction, in which one beam may erase the grating while the other beam acts as reading beam. Afterwards, the diffraction signal decreases as a result of the erasure of isomerization grating induced by the uniform red reading beam. Once the isomerization grating is completely erased, the remnant reorientation grating is stable. The results show this grating can be read repeatedly for 12 hours without obvious attenuation by using 647 nm beam with an intensity 200 mW/cm$^2$. Additionally, the reorientation grating can be easily erased by, for example, but not limited to, a circularly polarized blue or UV light or by heat. Similar results are obtained if we use circularly polarized blue light instead of p-polarized, but the signal intensity is lower in this case.

Figure 8:
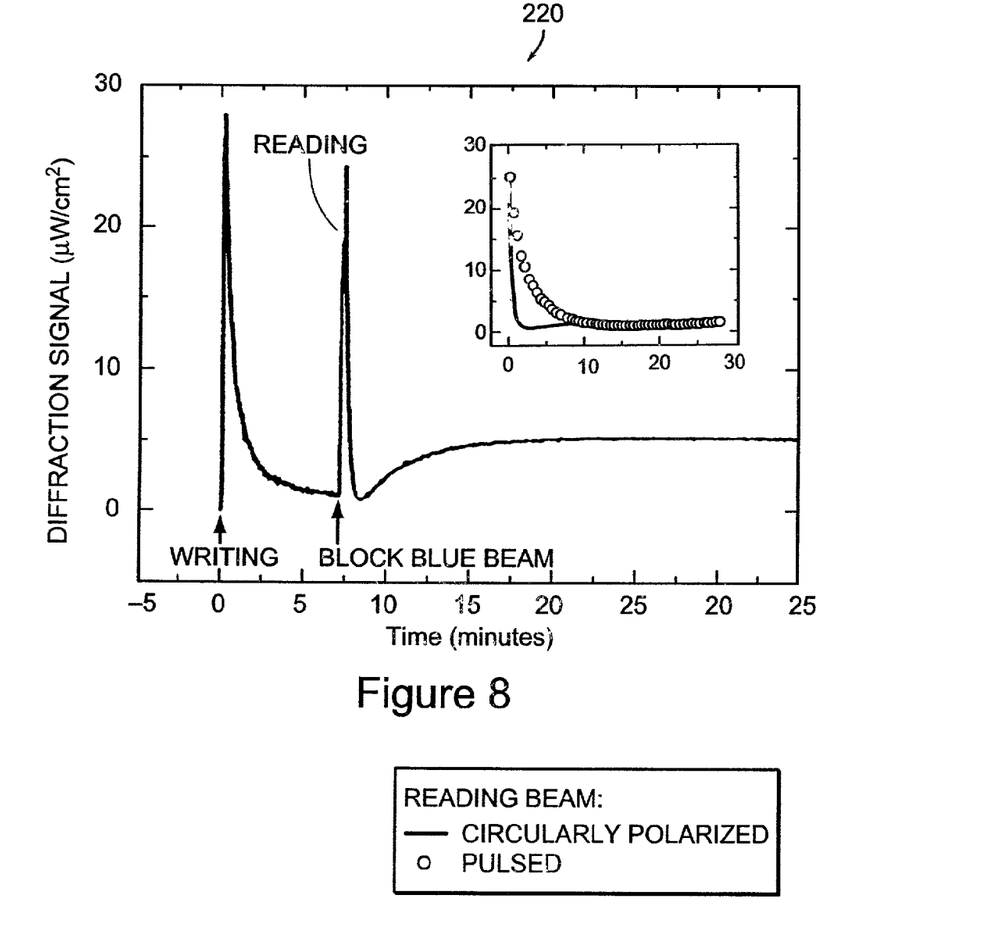
FIG. 8 graphically illustrates the diffraction signal as a function of time and more particularly grating recording and renewal by the reading beam with s-polarized red and blue beams in accordance with a preferred embodiment of the present invention.

FIG. 8 graphically illustrates the diffraction signal as a function of time and more particularly grating recording and renewal by the reading beam with s-polarized red and blue in accordance with a preferred embodiment of the present invention. Thus, the results of the grating formation and read-out by using both s-polarized blue and red beams is illustrated. It is found that the diffracted signal exhibits a fast response at the beginning when the writing beams are turned on. The diffracted signal exhibits a peak, as fast as about one second, when the writing beams are turned on. The formation of the initial diffraction peak is due to the isomerization grating. The blue light causes the trans azobenzene molecules to isomerize to the cis form with the same molecular orientation because the photoisomerization process is much faster than the molecular reorientation. Since the red light exists at the same time and its polarization direction is parallel to the cis molecular axes, the cis-to-trans isomerization occurs immediately in the bright fringe area and results in an isomerization grating. After the molecular reorientation begins, the molecular population with their axes in the direction of the blue light polarization decreases; as such the intensity of the diffracted light from the isomerization grating decreases.

The isomerization grating depends on the polarization of the pre-irradiated blue light. The pre-irradiation using p-polarized blue light results in the largest initial peak, and with s-polarized pre-irradiation there is almost no initial peak. The reason is the p-polarized blue light provides more initial cis isomers in the direction of red s-polarization than the s-polarized blue light before writing the grating.

FIG. 8 also illustrates that when the blue beam is blocked, the diffracted light from the isomerization grating increases again due to the same fact as described with respect to FIG. 7. After the signal reaches a maximum, writing or optical recording is stopped and a red beam is used to read the grating. A grating renewal effect induced by the reading process is observed in a preferred embodiment of the present invention. This effect is observed when the red intensity is more than about 200 mW/cm$^2$. Due to the destruction of the isomerization grating, the signal decreases fast at the beginning. However, the grating is enhanced after the signal almost disappears. Read beams of different polarizations are used to investigate this effect. It is observed in a preferred embodiment that only s-polarized read process brings the enhancement. Additionally, the grating simply decreases to a value with the cis lifetime when short pulses are used to read to avoid erasure. This grating renewal originates from the re-alignment of the remnant cis isomers (in the dark fringe) by the s-polarized red beam during cis-to-trans isomerization process. The resulting trans isomers in the dark fringe exhibit a trend of s-direction reorientation induced by the uniform s-polarized red beam but no change in the bright fringe where the molecules are already turned to p-direction induced by s-polarized blue beam. As a result, a new reorientation grating is formed by the reading beam.

Figure 9:
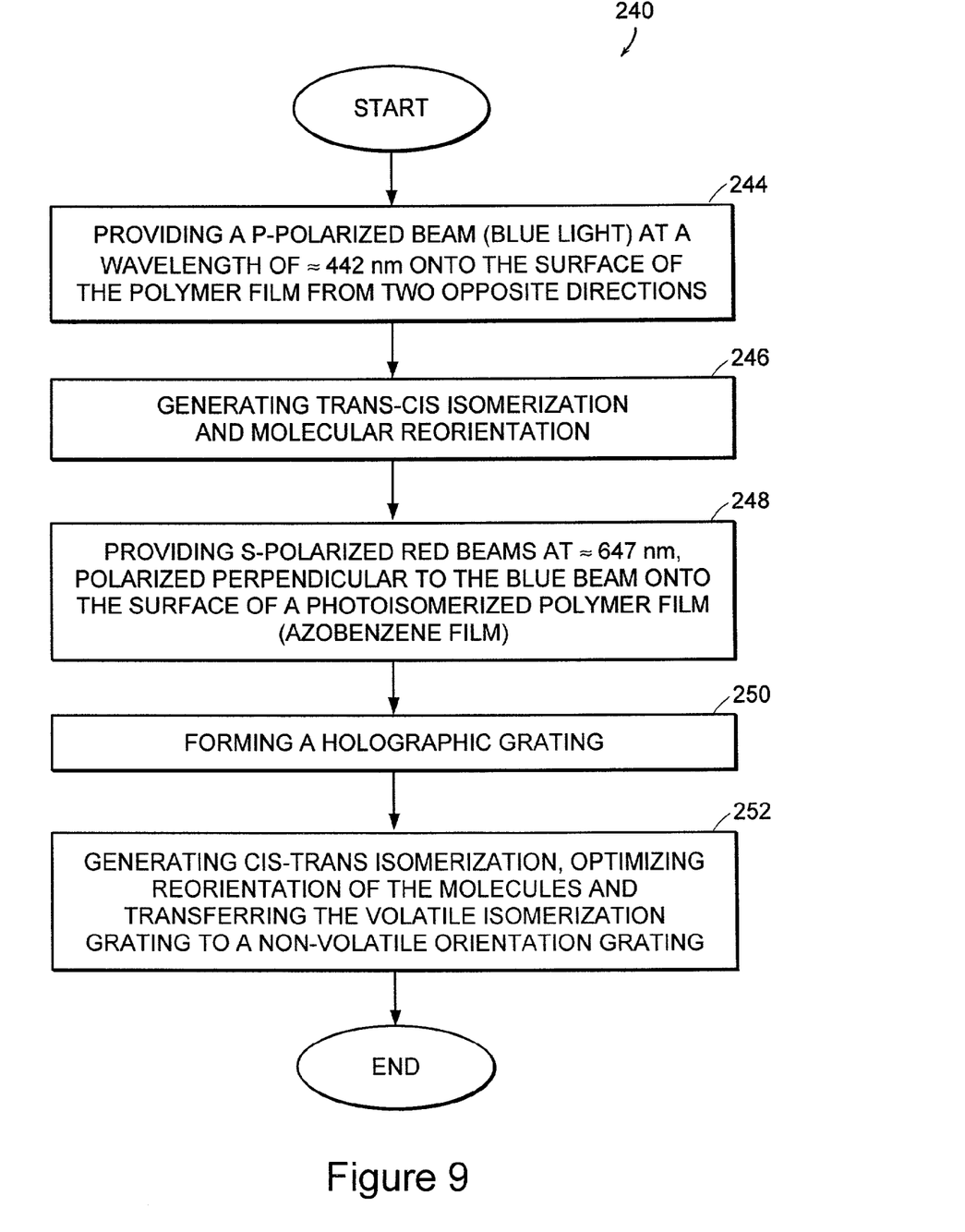
FIG. 9 is a flowchart illustrating a method for optically recording data in accordance with a preferred embodiment of the present invention.

FIG. 9 is a flowchart illustrating a method for optically recording data in accordance with a preferred embodiment of the present invention. The method 240 includes providing a p-polarized beam (blue light) at a wavelength of ≈442 nm onto the surface of the photoisomerized polymer film (azobenzene film) from two opposite directions per step 244. The method then includes generating trans-cis isomerization and molecular reorientation per step 246. Further, the method includes providing s-polarized red beams at ≈647 nm, polarized perpendicular to the blue beam onto the surface of a photoisomerized polymer film (azobenzene film) per step 248. In step 250, the method includes forming a holographic grating. The method then proceeds to step 252 which includes generating cis-trans isomerization, optimizing reorientation of the molecules and transferring the volatile isomerization grating to a non-volatile orientation grating. In a preferred embodiment, a pre-irradiation step may be included prior to writing which may include, but is not limited to, pre-irradiating the photoisomerized polymer film using a circularly polarized blue light.

Figure 10:
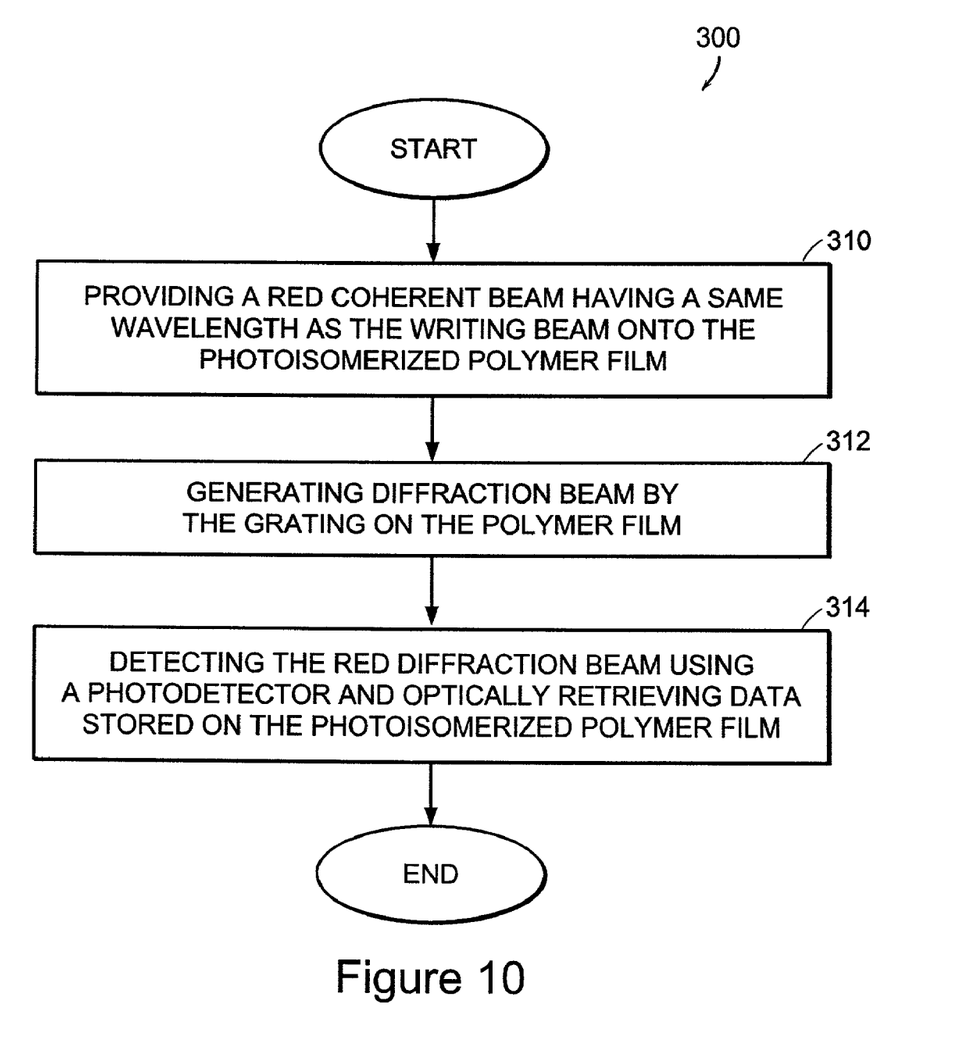
FIG. 10 is a flow chart illustrating a method for optically retrieving data in accordance with a preferred embodiment of the present invention.

FIG. 10 is a flow chart illustrating a method for optically retrieving data in accordance with a preferred embodiment of the present invention. The method 300 begins with providing a red beam having a same wavelength as the writing beam onto the photoisomerized polymer film per step 310. Per step 312, the method includes generating diffraction beam by the grating on the polymer film. The method includes detecting the red diffraction beam using a photodetector and optically retrieving data stored on the photoisomerized polymer film per step 314.

Polymer thin films doped with photo-sensitive dyes are formed, in accordance with the present invention by using, without limitation, a spin-coating method, and/or a dip-coating method. Using a spin-coater or a dip-coater a plurality of azobenzene contained polymer thin films can be developed such as PMMA polymer doped with 4-dimethylamino-azobenzene (MY-PMMA thin film), and poly(vinyl alcohol) (PVA) gel doped with 4-[4-dimethylamino-phenylazo]benzenesulfonic acid, sodium salt, (MO-PVA thin film).

Spatial light modulators (SLM) are useful devices for wavelength conversion or incoherent-to-coherent optical conversion in optical information processing. SLM's are described in a publication entitled "Spatial light modulation with an azobenzene-doped polymer by use of biphotonic holography," by Pengfei Wu et al, Jun. 15, 1999, Vol. 24, No. 12, Optics Letters, the entire teachings of which being incorporated herein. Phase conjugation, two-beam coupling, and antisotropic diffraction in photorefractive crystals have been applied to conversion of incoherent images into coherent ones, but most of these devices show a negative replica of the incoherent image because incoherent light is used to selectively erase the grating. The photoinduced absorption change that occurs in some photochromic materials has also been applied to spatial light modulation and can produce a positive replica of an incoherent input image, but the photoinduced refractive-index change cannot contribute to the spatial light modulation procedure. The conversion quality depends on the photochromic efficiency of the optical materials and on the wavelength selection of optical materials and on the wavelength selection of both the pump and the probe beams. A preferred embodiment includes an all-optical spatial light modulation in a polymer film doped with azobenzene molecules, using a biphotonic grating. The grating is operated with two beams of light, one red and the other blue. The mechanism of grating formation originates from the trans⇌cis photoisomerization process in the azobenzene molecules. Short-wavelength blue light is used to excite the trans isomers of azobenzene to the cis form. The long-wavelength red light causes cis isomers to go back to the trans form. Using the trans⇌cis isomerization rate equation, when both color beams illuminate the sample, we can derive the steady-state modulation contrast of the cis population grating.

Figure 11:
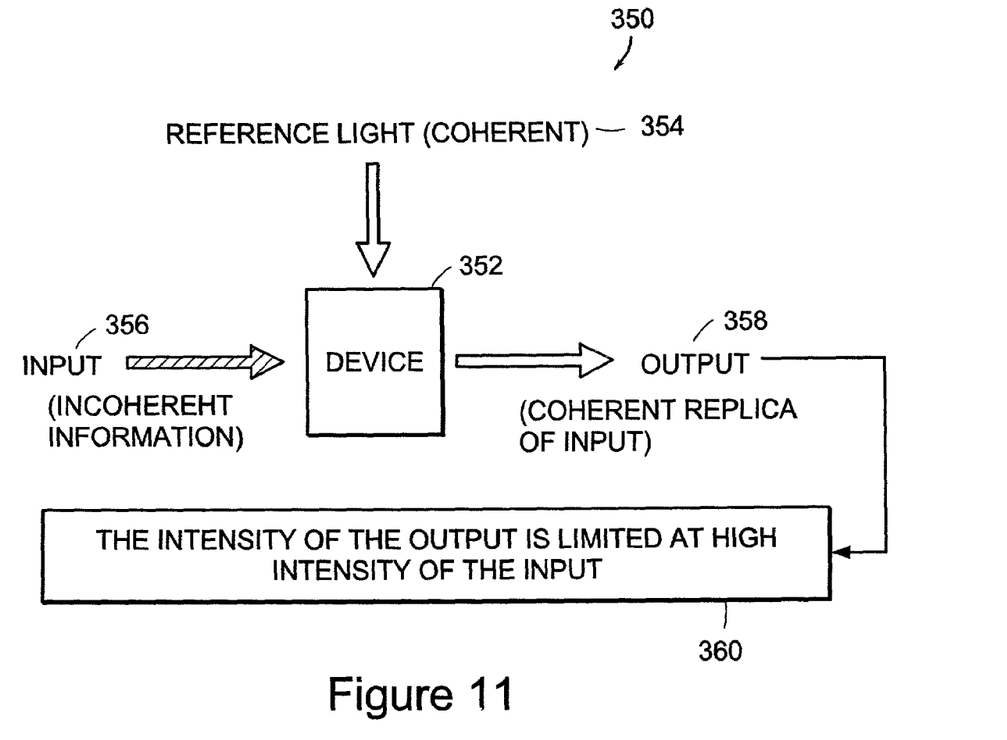
FIG. 11 is a schematic diagram illustrating a spatial light modulator (SLM) system in accordance with a preferred embodiment having the functionality of output-sign control and self-protective diffraction limits.

FIG. 11 is a schematic diagram illustrating an optical spatial light modulator (SLM) system in accordance with a preferred embodiment having the functionality of output-sign control and self-protective diffraction limits. SLMs play a significant role in all-optical and optoelectronic systems for image processing, optical interconnection, optical correlation, model recognition, and display techniques.

Biphoton holography and the MY-PMMA polymer thin film are used in a preferred embodiment of the present invention. Input incoherent light 356 with image information is imaged onto the device 352. Two coherent 647 nm beams (reference light) 354 interfere in the film. The output 358 of first-order self-diffraction bearing the image information is detected by an imaging detector such as, without limitation, a charge coupled device (CCD). Thus, using this preferred embodiment of the present invention, incoherent-to-coherent image conversion is obtained. The sign of the output image replica can be controlled by input blue light in a preferred embodiment. The device also has the ability to limit its diffraction efficiencies at higher input intensities, which can provide self-protection to photo-sensors of spatial light modulators and may be useful for power limiting applications.

This device further to realizing real-time incoherent-to-coherent image conversion also preserves the incoherent information for several minutes due to the very long cis→trans thermal isomerization process in the solid polymer. This is useful for important applications, such as, for example, in optical interconnection, optical associated memory and optical computing.

Figure 12:
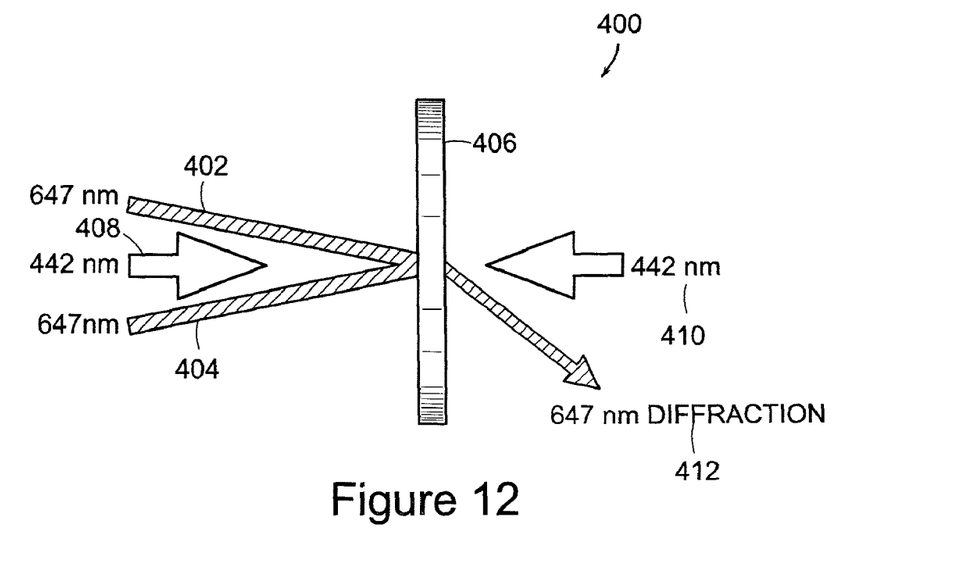
FIG. 12 is a diagram illustrating the beam configurations for diffraction used for preferred embodiments of the spatial light modulator system and for non-volatile holographic storage systems in accordance with the present invention.

FIG. 12 is a diagram illustrating the beam configurations for diffraction used for preferred embodiments of the spatial light modulator system and for non-volatile holographic storage systems in accordance with the present invention. The methods and systems for writing to a photo-isomerized polymer include inputting incoherent light 408, 410, having a wavelength, for example, of ≈442 nm onto a device including a photo-isomerized polymer film 406. Two coherent beams 402, 404 functioning as reference light are also incident onto the polymer film. The output beam 412 is a first order self diffracted beam having the image information and is detected by a detector. The wavelength of the self diffracted beam 412 is the same as the coherent beams 402, 404. In a preferred embodiment, it is about 647 nm.

The advantages of this systems and methods of the present invention include the use of small diode beams for the coherent red light and the same wavelength can be used for both writing and reading without using any additional electric field. The systems and methods of the present invention for optimization of molecular reorientation may also be useful for other applications such as optical display, information processing, and enhancement of second order nonlinearities.

The claims should not be read as limited to the described order or elements unless stated to that effect. Therefore, all embodiments that come within the scope and spirit of the following claims and equivalents thereto are claimed as the invention.

What is claimed:

1. A method of optically recording information in a storage medium comprised of a polymer material doped with a plurality of azobenzene molecules, each of the plurality of azobenzene molecules possessing molecular reorientation properties and being isomerizable from a trans isomer to a cis isomer upon irradiation with light having a blue wavelength, and being isomerizable from the cis isomer to the trans isomer upon one of thermal relaxation and irradiation with light having a red wavelength, the method comprising:

partially reorienting the plurality of azobenzene molecules by irradiating the storage medium with a first coherent light source that irradiates the storage medium with light having the red wavelength, and light from a second light source that irradiates the storage medium with light having the blue wavelength, wherein the light from the second light source has a p-polarization and is uniform, while the light from the first coherent light source has an s-polarization and forms a pattern that represents the information being recorded, the pattern providing bright fringes in a first plurality of locations in the storage medium and providing dark fringes in a second plurality of locations in the storage medium, wherein, in the first plurality of locations and the second plurality of locations, the light from the second light source interacts with trans isomers that are not oriented perpendicularly to the p-polarization by isomerizing said trans isomers to cis isomers, and wherein, in the first plurality of locations, the light from the first light source interacts with cis isomers by isomerizing said cis isomers to trans isomers; and generating a nonvolatile orientation grating at a temperature below a glass transition temperature of the polymer material by removing the light from the first coherent light source and the second light source for a relaxation period of time selected to be sufficiently long that cis isomers in the second set of locations relax to trans isomers having random orientations, while substantially all isomers located in the first set of locations are trans isomers having an orientation essentially perpendicular to the p-polarization.

2. The method of claim 1, wherein before partially reorienting the plurality of azobenzene molecules, the method further comprises generating a substantially randomly oriented distribution of trans isomers and cis isomers by irradiating the storage medium with light from the second light source which has a circular polarization and is uniform.

3. The method of claim 1, further comprising reading the information upon irradiating the storage medium with a uniform light from the first coherent light source having a wavelength that is the same as the red wavelength.

4. The method of claim 3, wherein the storage medium maintains the non-volatile orientation grating upon irradiation with the uniform light from the first coherent light source having a wavelength that is the same as the red wavelength.

5. The method of claim 1, wherein below the glass transition temperature of the polymer material, the polymer material forms a matrix in which the trans isomers cannot reorient.

6. The method of claim 1, wherein the polymer material is a poly vinyl alcohol polymer material.

7. The method of claim 6, wherein the glass transition temperature of the polymer material is approximately 85 degrees Celsius.

8. The method of claim 1, wherein the polymer material is a PMMA polymer material.

9. The method of claim 1, wherein the pattern is an interference pattern of a plurality of beams originating from the first coherent light source.

10. The method of claim 1, wherein the red wavelength is approximately 647 nm and the blue wavelength is approximately 442 nm.

11. The method of claim 1, further comprising reading information recorded in the storage medium, the reading including:
   irradiating the storage medium with light from a coherent light source that irradiates the storage medium with light having a red wavelength, and having a difference in a diffraction index of the storage medium in the first plurality of locations and a diffraction index of the storage medium in the second plurality of locations; and
   locating the non-volatile orientation grating by detecting light from the coherent light source diffracted off of the storage medium with a photodetector.

12. The method of claim 11, wherein the coherent light source irradiates the storage medium with light having the red wavelength that is the same as a wavelength used for recording the information.

13. The method of claim 11, wherein the storage medium maintains the non-volatile orientation grating upon irradiation by the coherent light source having a red wavelength.

14. The system of claim 11, wherein the storage medium is at a temperature below the glass transition temperature of the polymer material, wherein the polymer material forms a matrix in which the trans isomers cannot reorient.

15. The method of claim 11, wherein the polymer material is a poly vinyl alcohol polymer material.

16. The method of claim 15, wherein the glass transition temperature of the polymer material is approximately 85 degrees Celsius.

17. The system of claim 11, wherein the polymer material is a PMMA polymer material.

* * * * *